C. C. ALLEN.
SKID CHAIN TIGHTENER.
APPLICATION FILED OCT. 4, 1919.
1,344,472.
Patented June 22, 1920.
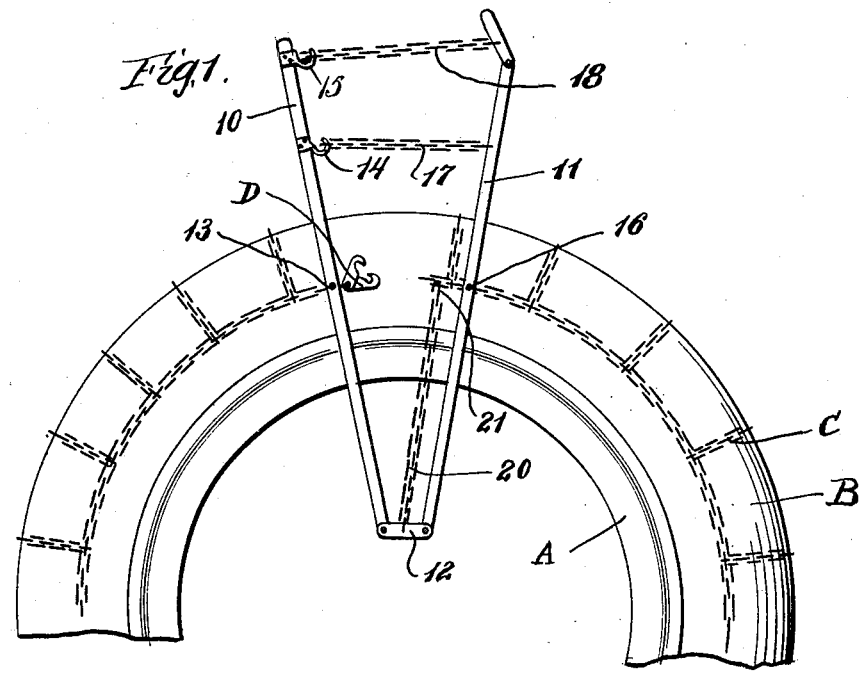
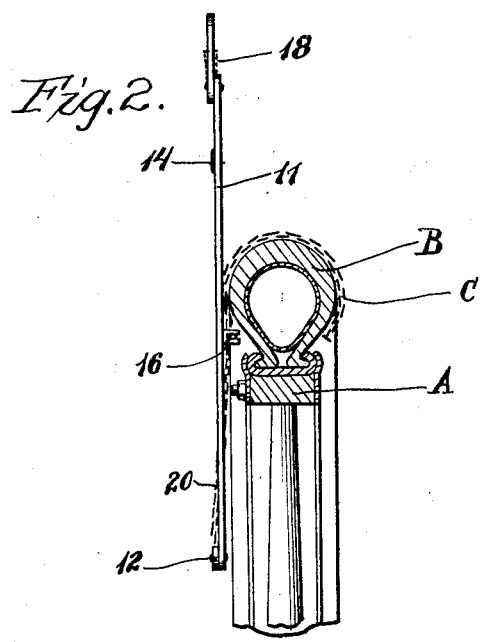
Witness
Benj. Kahn.
Inventor
C. C. Allen
By Victor J. Evans
Attorney

UNITED STATES PATENT OFFICE.

CHARLES C. ALLEN, OF RAYMILTON, PENNSYLVANIA.

SKID-CHAIN TIGHTENER.

1,344,472.

Specification of Letters Patent. Patented June 22, 1920.

Application filed October 4, 1919. Serial No. 328,382.

*To all whom it may concern:*

Be it known that I, CHARLES C. ALLEN, residing at Raymilton, in the county of Venango and State of Pennsylvania, have invented new and useful Improvements in Skid-Chain Tighteners, of which the following is a specification.

This invention relates to automibile tools, particularly to skid chain tighteners, and has for its object the provision of a tool adapted for association with the wheel of an automobile whereby a skid chain may be quickly and easily drawn tightly upon a tire to the desired degree whereby to prevent the chain from gripping excessively or from falling against the fender during rotation.

An important object is the provision of a device of this character including lever arms movable with respect to each other and carrying chains for holding the levers together whereby the skid chain may be taken up or tightened link by link until the desired degree of tightness is obtained.

Another object is the provision of a device of this character which is provided with means whereby the skid chain may be held firmly with respect to the center of the wheel so that all slack therein may be taken up, if desired.

An additional object is the provision of a device of this character which will be simple and inexpensive in manufacture, efficient in use, durable in service, and a general improvement in the art.

With the above and other objects and advantages in view, the invention consists in the details of construction to be hereinafter more fully described and claimed, and illustrated in the accompanying drawing, in which—

Figure 1 is a side elevation of a portion of an automobile wheel having a tire thereon and showing my device associated with a skid chain, and Fig. 2 is a cross sectional view through the wheel showing my device in end elevation.

Referring more particularly to the drawing, the letter A designates an automobile wheel equipped with the usual tire B and C designates a skid chain thereon. The chain is of ordinary construction and has one end provided with the usual hook D.

In carrying out my invention I provide a pair of lever arms 10 and 11 which are pivotally connected at one end with a supporting bar 12 and which are adapted for movement toward and away from each other. Intermediate its ends, the lever 10 carries a hook 13 and adjacent its other end a hook 14 and at its extremity a hook 15. The lever arm 11 carries intermediate its ends a hook 16 and carries adjacent its other end a chain 17 and at its extremity a chain 18.

In the operation of the device, the lever device is engaged upon the wheel and the hook 13 is engaged within the skid chain link immediately back of the hook D and the hook 16 on the lever 11 is engaged within one of the links of the skid chain a few links removed from the extremity thereof. The operator then grasps the levers 10 and 11 and squeezes them together as far as possible and hooks one of the links in the chain 18 onto the hook 15 to hold the levers against separation. He then engages whichever link of the skid chain that is possible upon the hook D, after which he disengages the chain 18 from the hook 15 and moves the levers apart, reëngaging the hook 16 in a different link in the skid chain farther from the end thereof. The levers are then drawn together as before and the next successive link engaged upon the hook D. This operation is continued until the skid chain is drawn sufficiently tightly about the tire.

In case the skid chain is worn or if for any other reason it cannot be tightened in this manner, use is made of the chain 18 which is adapted to have its links engaged upon the hook 14 and the operation is the same as in the preceding case except that the chain 18 is used.

In case it is desired to draw the skid chain very tightly upon the tire, I make use of a chain 20 which is connected with the supporting bar 12 and which is provided with a hook 21 engageable with the skid chain adjacent one end thereof. After the hook 21 is engaged with the skid chain, the levers are operated in the manner previously described and the skid chain is thus tightened, the function of the chain 20 being to hold the skid chain toward the center of the wheel.

From the foregoing description and a study of the drawing, it will be apparent that I have thus provided a very simple, inexpensive, and readily operable device whereby a skid chain may be very quickly and easily tightened upon a tire.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:—

A device of the character described comprising a pair of pivoted levers movable toward and away from each other, a hook on each lever intermediate the ends thereof and engageable within selected links adjacent the ends of a skid chain, a hook at the end portion of one lever, a chain carried by the end portion of the other lever and having its links selectively engageable upon said second named hook, and a chain connected with said levers adjacent their pivot points and terminating in a hook engageable within a selected link adjacent one end of the skid chain whereby to hold the skid chain against movement away from the center of the wheel or tire to which it is applied.

In testimony whereof I affix my signature.

CHARLES C. ALLEN.